(12) United States Patent
Lee

(10) Patent No.: US 11,442,772 B2
(45) Date of Patent: Sep. 13, 2022

(54) COLLABORATIVE AND DYNAMIC MOBILE WORKFLOW EXECUTION PLATFORM

(71) Applicant: Francis Lee, Jacksonville, FL (US)

(72) Inventor: Francis Lee, Jacksonville, FL (US)

( * ) Notice: Subject to any disclaimer, the term of this patent is extended or adjusted under 35 U.S.C. 154(b) by 379 days.

(21) Appl. No.: 16/881,483

(22) Filed: May 22, 2020

(65) Prior Publication Data

US 2021/0365284 A1 Nov. 25, 2021

(51) Int. Cl.
| | |
|---|---|
| *G06F 9/46* | (2006.01) |
| *G06F 8/30* | (2018.01) |
| *G06F 16/27* | (2019.01) |
| *G06Q 10/06* | (2012.01) |
| *G06F 21/60* | (2013.01) |
| *H04W 88/02* | (2009.01) |

(52) U.S. Cl.
CPC ............... *G06F 9/468* (2013.01); *G06F 8/31* (2013.01); *G06F 16/275* (2019.01); *G06F 21/604* (2013.01); *G06Q 10/06316* (2013.01); *H04W 88/02* (2013.01)

(58) Field of Classification Search
CPC .......... G06F 8/31; G06F 9/468; G06F 16/275; G06F 21/604; G06Q 10/06316; H04W 88/02
USPC .......................... 717/114, 115; 718/100, 102
See application file for complete search history.

(56) References Cited

U.S. PATENT DOCUMENTS

| | | | | |
|---|---|---|---|---|
| 5,892,900 | A * | 4/1999 | Ginter | G06F 21/78 726/26 |
| 8,863,107 | B2 * | 10/2014 | Krivopaltsev | H04L 41/20 717/173 |
| 2011/0010340 | A1 * | 1/2011 | Hung | H04L 67/52 709/204 |
| 2011/0246527 | A1 * | 10/2011 | Bitting | G06F 21/604 707/E17.001 |
| 2017/0287090 | A1 * | 10/2017 | Hunn | G06Q 50/18 |
| 2019/0213518 | A1 * | 7/2019 | Lee | G06Q 20/389 |
| 2020/0110796 | A1 * | 4/2020 | Tsabba | G06F 8/38 |
| 2020/0328885 | A1 * | 10/2020 | Tola | H04L 9/3066 |

OTHER PUBLICATIONS

Pajunen et al., "Developing Workflow Engine for Mobile Devices", 2007, IEEE, pp. 279-286. (Year: 2007).*

* cited by examiner

*Primary Examiner* — Ted T. Vo

(74) *Attorney, Agent, or Firm* — Lawrence J. Gibney

(57) ABSTRACT

This invention is a fully functional workflow platform or middleware on a mobile device that is able to create, modify and execute its own workflow scripts and synchronize with external services on the mobile device or on a remote back-end such as a server using asynchronous and/or synchronous communications. This invention also includes a back-end computing platform that integrates with the mobile device. The back-end platform also provides a marketplace and tools for multiple parties to develop and trade configurations of the platform and software that may be used to extend the capabilities of the workflow platform and license the use of the platform's complete set of capabilities.

7 Claims, 21 Drawing Sheets

COLLABORATIVE AND DYNAMIC MOBILE WORKFLOW EXECUTION PLATFORM

RELATED APPLICATIONS

This is a continuation in part and the applicant claims the benefit of a provisional application with Ser. No. 62/385,614 and a filing date of Sep. 9, 2016 and claims the benefit of the non-provisional application with Ser. No. 15/732,071 with a filing date of Sep. 13, 2017.

BACKGROUND OF THE INVENTION

A. Field of the Invention

The present invention relates to a mechanism for workflow script creation and the execution of that program on a mobile electronic device that may operate autonomously. The invention also includes a back-end computing platform that integrates with the mobile device. Together the back-end computing platform and the mobile electronic device provide a platform for the execution of mobile business processes. The back-end computer platform also enables users to trade platform configurations for individual industries/vertical markets, workflow templates, activity templates and utilities that support the workflow platform both on the mobile device and on the back-end.

B. PRIOR ART

There are many other prior art references to workflows and business process applications using networks.

A representative example of this can be found in Flores U.S. Pat. No. 5,734,837 which is a method and apparatus for building a business process application in terms of its workflow.

Another representative example can be found at Rachamadugu U.S. Pat. No. 9,076,311 which is a method and apparatus for providing remote workflow management. Yet another example that can be found in the prior art can be found at Peed U.S. Publication 2014/0229227. Peed teaches a business process workflow system. Hung U.S. Patent Application 2011/0010340 A1 also provides a method for sharing data amongst a group of a plurality of mobile devices.

However, while these particular applications which are representative examples of items in the prior art, none of them incorporate the various features that are found in this particular application.

This particular invention allows multiple users and organizations to create, interact with, receive information from and change workflows on a mobile device and for the mobile device to change its own workflow to increase efficiency and productivity.

The back-end computing platform may be used to create new platform configurations, new workflow templates and workflow scripts for execution on the mobile device or on the back-end platform. An electronic vault is used to record the ownership of platform configurations for specific vertical markets, workflow templates and utilities used by the platform, and to enable trading of these items.

BRIEF SUMMARY OF THE INVENTION

The present invention provides a fully functional workflow platform a mobile device that may receive, execute, and modify workflow scripts and synchronize with a remote back-end such as a server using asynchronous and/or synchronous communications. The invention supports stand-alone or imported workflow scripts that are specific to the performance of a single job on a mobile device with a rich feature set. The mobile device may be provided with the workflow script that it has to execute by the mobile devise itself or by a back-end computer service. The mobile device is used as a fully-fledged computer to provide a unique and novel technology stack. The mobile device continues to process a workflow script autonomously if it has no connection with external back-end services. The mobile device can be used as an extension of enterprise or back-end applications and workflows. The workflow script can invoke third party applications or services, on the phone or mobile device and elsewhere. Third-party applications, services or users on the phone or mobile device and elsewhere, can invoke the execution of a workflow script. Also, the present invention allows for a workflow script to invoke another workflow script.

The platform enhances collaborative cooperation and communication by allowing multiple individuals or parties to communicate and collaborate in real-time, share, view, accept and change the progress of workflow script execution—the process of carrying out tasks using the computational power of the mobile device to complete, execute or record the execution of a business process.

The unique aspects of the present invention include the mechanism used for creating a unique workflow script for each job to be executed by the mobile device. This enables the platform to support workflow script execution and collaboration between multiple parties for any mobile business in any vertical market. The system provides for one or more parties to provide new information that is used to dynamically modify, terminate, or replace a workflow script that is being executed on the mobile device in real-time. The workflow script may also require additional information from the relevant party or parties, so that it can update or complete its structure as needed.

During the execution of the workflow script (a "job"), the mobile device creates "job events". These job events are transmitted to authorized, subscribing parties for processing (for example by using an API, text message, email, push notification or web service over any network such as GSM, Bluetooth or wi-fi). The complete history of any job, including the workflow script(s) that was executed, the order for the job to be performed, contextual information, application events, workflow execution events ("job events") and system events may be stored on a back-end computer system and/or shared with users of the system.

The invention utilizes a back-end computer platform to provide an online marketplace that enables parties create and trade business templates—new configurations of the system for a specific business or vertical market. Developers can also trade computer applications that are compatible with the system. Market place participants can also use tools provided by the system to define workflow templates (that define the outline of workflow scripts), action templates (that define the activities to be performed within a workflow script) and the data processed by the system. The marketplace also provides licenses for the use of the system's features to multiple business instances of the system dedicated to a specific business or market area and to the users of those business instances.

DETAILED DESCRIPTION OF THE EMBODIMENTS

Figure 1:
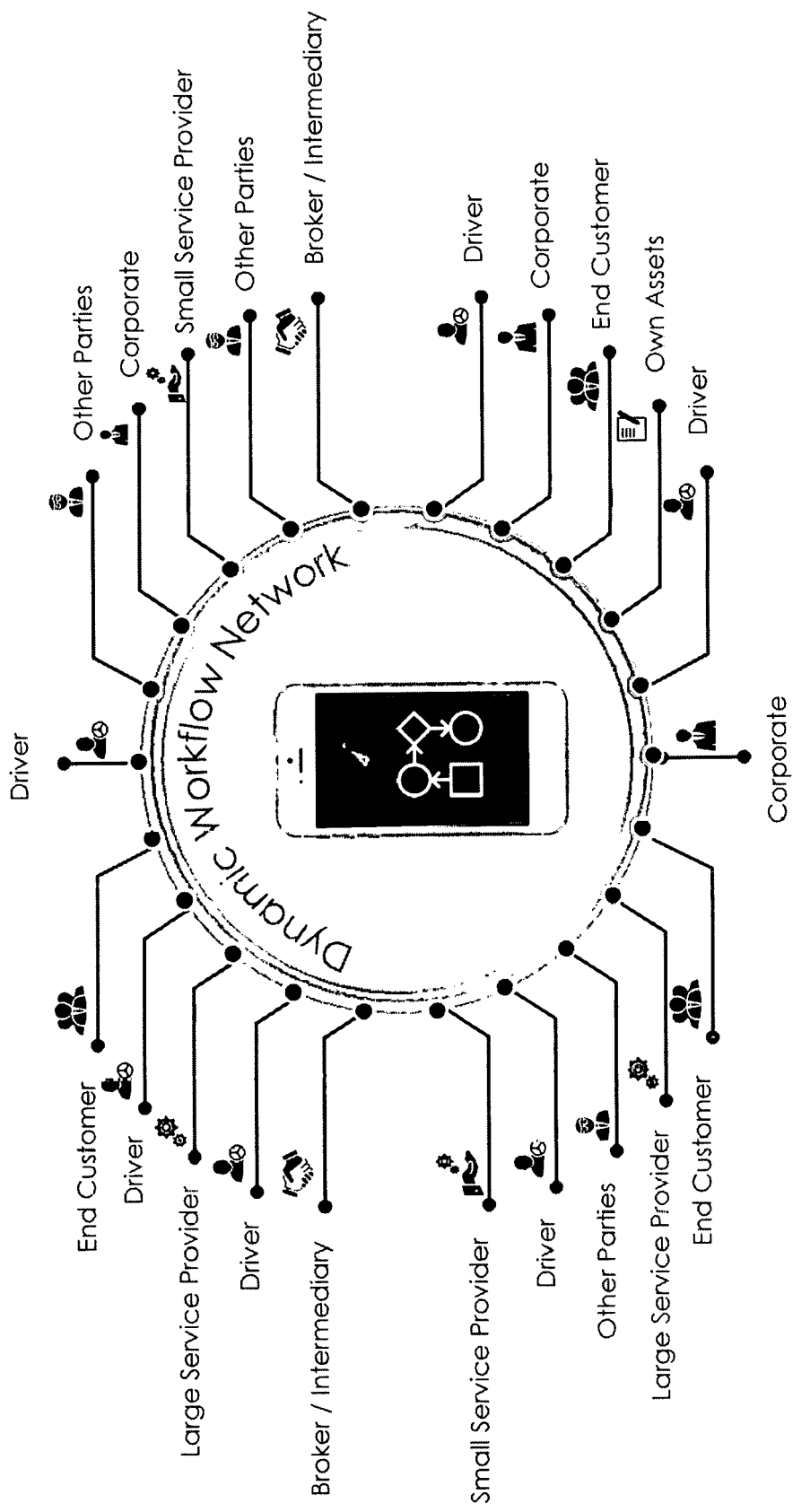
FIG. 1 is a schematic representation of the present invention that depicts various parties being able collaborate and to interact with the execution of a workflow script on a mobile device.
Figure 2:
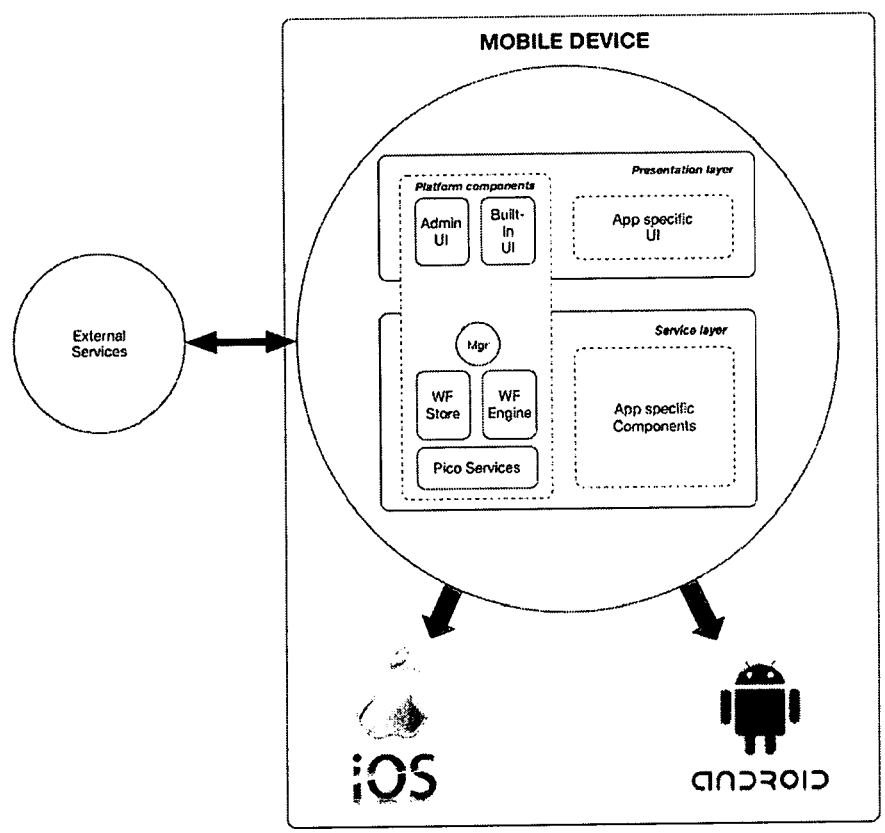
FIG. 2 depicts various layers of the mobile device workflow platform.
Figure 3:
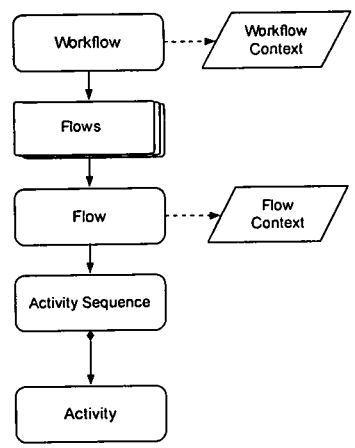
FIG. 3 is a flowchart representation of a workflow model, as described by workflow templates and workflow scripts.
Figure 3:
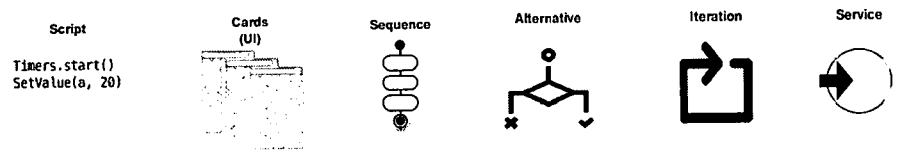
Figure 4:
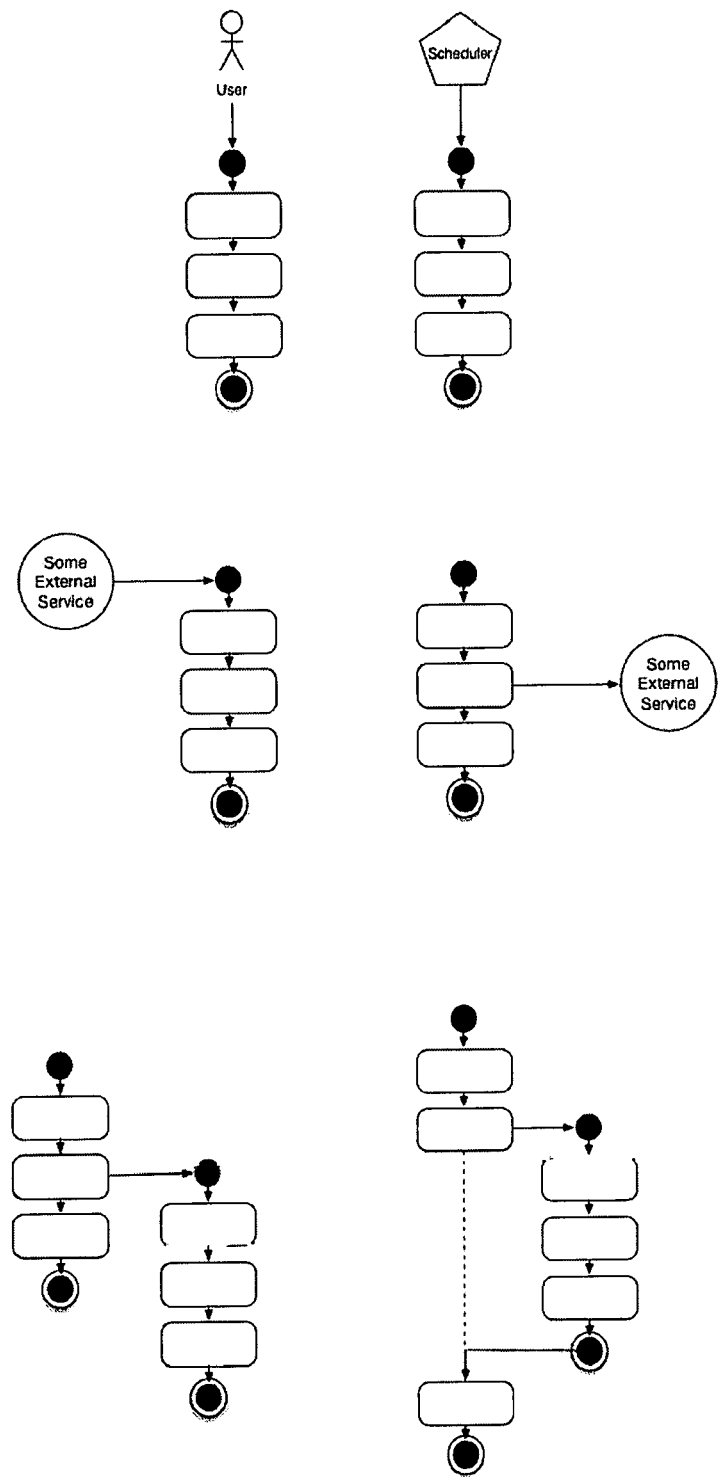
FIG. 4 is a flowchart representation of different workflow invocations supported by the mobile device's workflow engine.

The present invention is a software platform or middleware that is to be provided on mobile devices and on a back-end computer system for remote access computing in the delivery and execution of mobile services requiring efficient coordination and collaboration between multiple parties and efficient job execution. This software platform can be particularly useful in the transportation industry, for the on-demand services industry, and many others. In essence this invention is for a software platform that is designed to support individuals and businesses of any size in any mobile industry and enable them to effectively compete against each other as well as to collaborate together.

For example, in the transportation industry, the present invention can support the self-interests of all players, such as the consumers, the shippers, the carriers, the brokers, the ports and others. With regard to trucking, the present invention can allow a small trucking company to work directly for major shippers or brokers. With regard to creation and operation of a transportation network, the present invention allows for the design and execution of a load-specific workflow that provides real time visibility and control over load execution to all permitted parties for that load. The template of workflow used for a specific load may be pre-agreed between the parties and may include workflow elements (actions and activities) specific to each contract, business, location, and product involved in the execution of the load. The invention also allows for certain access rights and responsibilities to be designated to certain individuals, including individuals involved in the execution of a job ("Job Actors") and those not involved in the execution, and for a plurality of individuals to effectively collaborate during the execution of an action within the workflow and for separate workflows to be created in such a way that they may interact with each other. For example, the driver of the vehicle responsible for a delivery may execute a workflow on his/her mobile device and the person responsible for receiving the load may also execute a workflow on his/her device. The completion of the delivery is only confirmed when both the mobile devices of driver and the receiver have both registered their respective confirmations in the respective workflows processed on each person's mobile device. Another example of linked workflows might be in ordering a pizza, the workflow for the delivery of the pizza can only take place when the workflow for cooking the pizza is complete.

In the on-demand services industry the present invention has a broad application. For example, the invention can be utilized by the following, but not limited to, food delivery men and women, couriers and messengers, roofers, electricians, cab drivers, nurses, dog walkers, home caterers, homecare services, cleaners, yard services, pool cleaning and handy-man services to name a few. This invention allows individuals and small private businesses to be protected from and compete effectively with large companies through being able to access "on demand" disruptive technologies.

The platform allows for the ability to run a full business process/workflow script on a mobile device. It provides a workflow engine on a mobile platform and treats a mobile electronic device like a full back-end server. By providing processing "on-the-edge" of the network, computational loads on back-end servers may be reduced and the requirement to modify back-end systems to support new services may also be reduced significantly. The workflow can be either standalone on the mobile device or part of a broader orchestration such as a higher-level process on a back-end computer system.

Compute intensive processes may also be delegated, by configuration or on-demand, to a back-end computer system. For example, processes such as the generation of workflow scripts, providing navigation directions to a given location, calculation of an estimated time of arrival and interactions with other computer systems may be delegated to a back-end computer.

This is an application which can effectively increase the efficiency and reduce the cost of executing a business process through using a mobile electronic device. The mobile electronic device will enable connection and sharing of process execution information between the service provider responsible for the delivery of any mobile service and any other parties with an interest in that service, including the customer(s) for the service. For instance, it will also allow the service provider as well as the customer to interact with a broker or intermediary if the broker has arranged for the services to be provided by the service provider to the customer. The platform enables appropriate delivery instructions to be executed on the mobile phone of the service provider (such as the driver of a truck) and for appropriate changes to those instructions to be conveyed at a given time. This system allows the flexibility to change a workflow process while it is being executed —something that is not found in traditional workflow processes.

A workflow script may be generated or written in a scripting language (such as Python, Lua or Ruby), defined by using a data interchange format (such as JSON) or defined by using a computer mark-up language (such as XML or BPEL). The workflow script is interpreted by a workflow engine on the mobile device in order to execute a workflow. As directed by the workflow script, the workflow engine may access services provided by the mobile device (for example but not limited to displaying a form on the screen, accessing the mobile device's camera, accessing the GPS location of the mobile device, accessing a Bluetooth sensor through the device, or obtaining the current time). As directed by the workflow script, the workflow engine may execute "Cards". Cards are defined as a user interface and/or functionality that is created independently of the workflow. Cards may provide the user interface on the mobile device, computer algorithms to be executed on the mobile device and the system's interactions with external services and other applications on the mobile device. Cards may be developed by third parties and provided as standard pieces of functionality to be accessed by workflows during execution.

Figure 6:
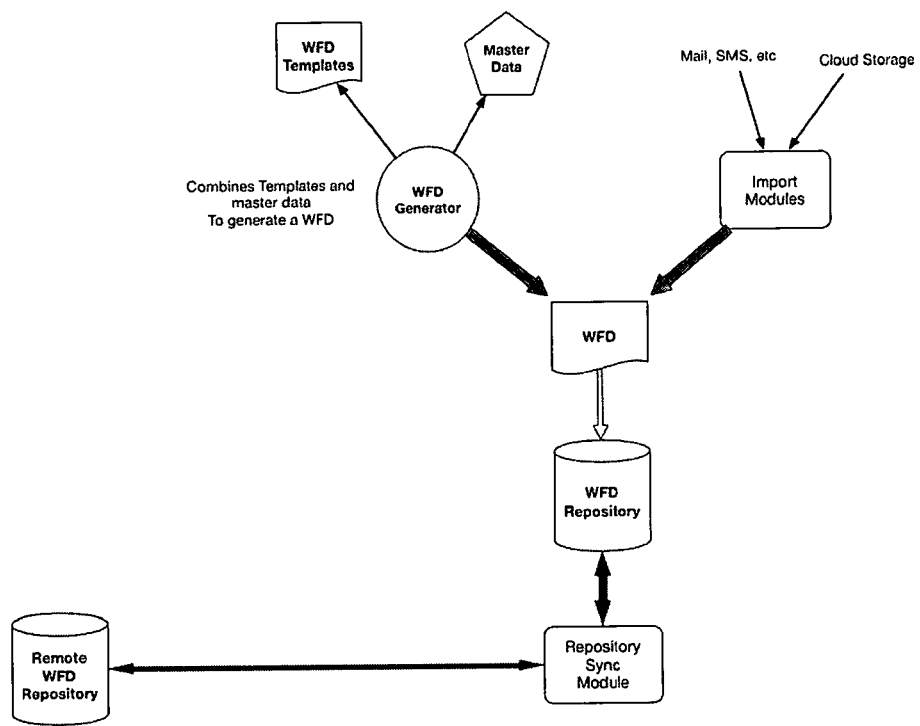
FIG. 6 depicts an information repository used by the workflow generator in the creation of workflow scripts.

Workflow scripts are generated from information contained in a definitions repository (that included workflow templates, action templates, message templates, activity templates, card definitions and data definitions—see FIG. 06) together with master data such as any combination of a contract, the type of work/job to be performed, the details of the specific Order for a service to be performed, parameters, settings, together with the businesses, locations, products and services involved in the execution of the workflow. The arrangement enables the creation of a specific, individual executable program (the workflow script). A workflow template provides a basic structure for the workflow script. It is written in the same scripting language as the workflow script. At key points in the workflow template, mark-ups or "script tags" are included to indicate to the workflow generator that certain Actions (as indicated by an Order) should take place at that point during the execution of the workflow. Examples of such Actions might be "Collect" or "Deliver". Depending on the specific context in which a workflow is being executed, each Action may have a very different meaning. For instance, in a port "Deliver" might mean "Check in at the gate, Weigh the truck, Leave the Container at a specific location." For a domestic parcel delivery to a specific location, "Deliver" might mean "Ring the doorbell when delivering, take a photo of the parcel. If no one responds, leave the parcel with the neighbor."

Each Action corresponds to a specific set of Activities, as recorded in an "Action Template". These Activities are reflected in the workflow script by both the logic of the workflow script and the specific "cards" (the functionality and UX to be used) on the mobile device during the execution of each Activity.

Example A

For purposes of this example the following entities will be identified: Driver, Pharmacy A and Jane Doe. In this example a Driver (the service provider in this instance) is hired to deliver medicine to Jane Doe between 10:30 and 11:00 in the morning after picking up the medicine at Pharmacy A between 7:30 and 8:00.

In the example of the delivery of medicine, the Driver will use a workflow script that requires the job to be completed by the Driver picking up medicine from Pharmacy A and then delivering the medicine to Jane Doe. In this case, Pharmacy A will use a workflow template designed for the delivery of medicines as the basis for creating the specific workflow script to be used on this job. Pharmacy A may also input instructions to the creation of the workflow script that are specific to delivering to Jane Doe (for example, what to do if Jane Doe is not there when the Driver arrives at her home) and the medicines to be carried (for example, what to do if the medicines must be kept at a particular temperature). The instructions in the workflow script to be executed may include an instruction that the Driver is to pick up the medicine from Pharmacy A at a designated time, for example between 7:30 and 8:00 in the morning. Once the Driver arrives at Pharmacy A the driver may be instructed by the workflow script to obtain a receipt at Pharmacy A by scanning a bar code or QR code (as examples) that may include the name of the person who provided the medicine and the type/name of the medicine and the intended recipient-Jane Doe. The workflow script may then instruct the driver to deliver the medicine to Jane Doe and may also provide an address and directions. Once the driver arrives at the residence of Jane Doe the workflow script may instruct the driver to confirm delivery with Jane Doe or leave the medicine with a neighbor or leave it in the mailbox depending on the personalized instructions for Jane Doe that have been provided by the workflow script.

The workflow script may access a service on the phone (for example Google Maps) to provide specific driving instructions as well as a map; other optional information such as the best route and traffic conditions may also be provided. The workflow script may also display information on the Driver's phone that is specific to this job, for instance specific instructions as to how to find Jane Doe's front door.

Specific users that may be on the system (Pharmacy A, Driver and Jane Doe) will be able to see the progress of the job in real time. However, in this application Pharmacy A can limit access to information. For instance, in this example, Jane Doe is not privy to all the information that the Driver and Pharmacy A receive.

Either the Driver or Jane Doe may notify others in the group about unexpected events through the use of the system that enables communication of these events through media such as phone calls, SMS messages, emails and push notifications (as examples). Other users that work with Pharmacy A, but who are not involved in this scenario, will not have visibility of the job.

For instance the driver may notify those in the group that the delivery will be delayed and be able to inform those in the group the reason for the delay (excessive traffic, mechanical problems with the car etc.) and insert a projected new delivery time. This information can be shared with the others that are privy to the information in the group.

Jane Doe, as one of the users of the system, may also indicate that she will not be home during the anticipated original delivery time because of an unexpected event (sudden illness, doctor's appointment etc.) and instruct the driver to leave the medicine with the neighbor (and identify the neighbor) instead of hand delivering it to her as originally planned. In this way Jane Doe may influence a change in the original workflow script by changing the workflow script instructions as the execution of job is in progress.

In this manner, any of the persons in the group that are sharing information may influence the final result of a job completion by altering instructions and simultaneously informing everyone else (who is permitted) in the group.

Figure 5:
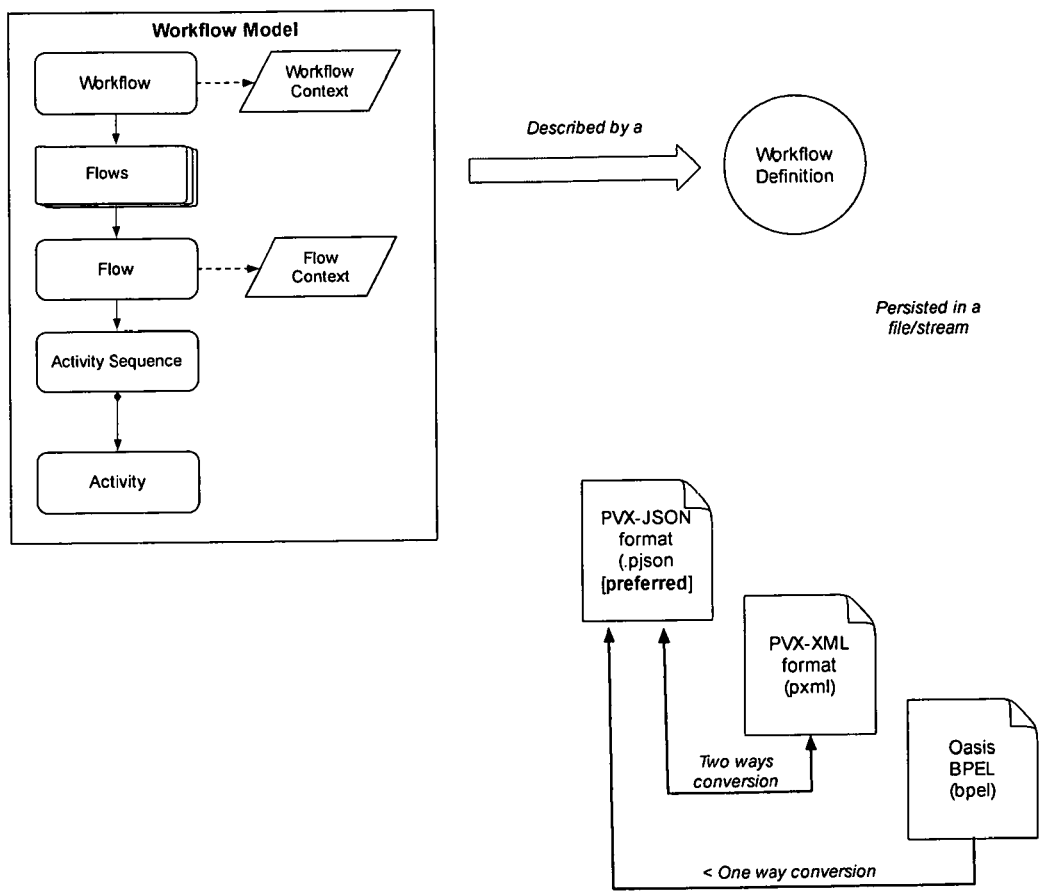
FIG. 5 depicts the structure of a Contract that defines the security and access model to itself, to orders and jobs processed under the contract. It also provides the reference framework to be used by the workflow generator when creating workflow scripts under this contract.
Figure 7:
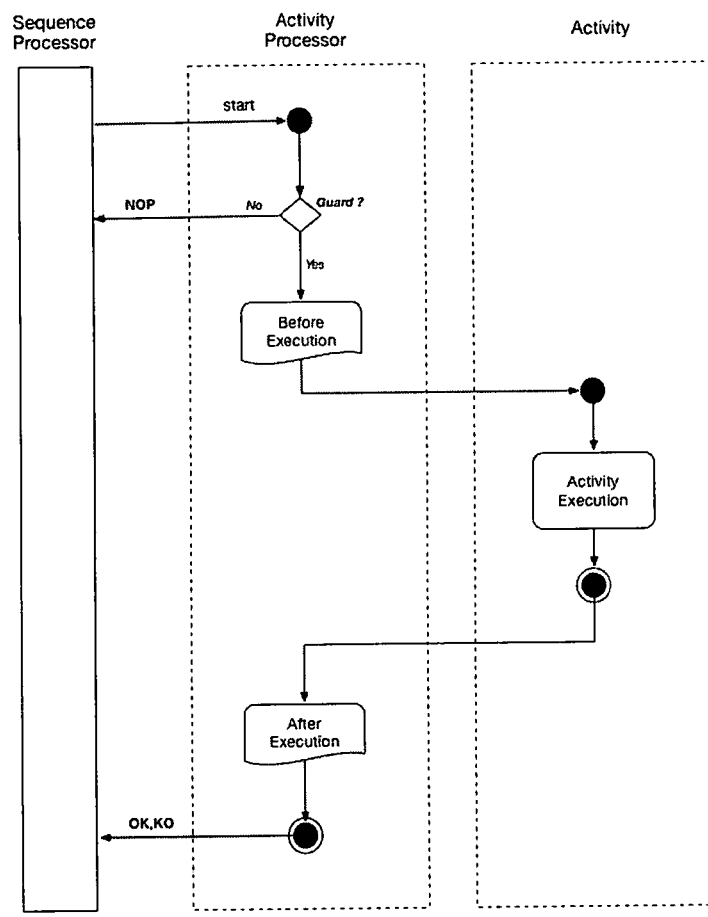
FIG. 7 depicts an example of precedence sequence that may be used when selecting which value of a data item to use, or which action template to use in workflow script generation.

For, the creation of a workflow script, the choice of which parameter value and which Action Template will be used for the creation of the script is determined by the workflow script generator using a precedence rule defined within the contract under which the work is to be performed (see FIG. 07). The workflow script generator is also guided by the contract between all the parties involved in the execution of a workflow, as defined by a Contract (See FIG. 05). The Contract provides the security framework in which the execution of the workflow is to be governed.

Action Templates provide short scripts in the same scripting language as the workflow template and the workflow script. There may be many Action templates for one Action. The choice of which Action template to be used depends on a defined precedence order (See FIG. 07).

Workflow scripts for execution on the mobile device may be generated on the mobile device, or by an external service on a back-end computer system. A generation engine, also known as workflow script generator, is used to create new workflow scripts from workflow templates and master data. Master data is data that the generator uses to drive the generation. For example. Master Data might include a job or an order and the settings and parameters for a business instance of the system that are used to guide the generation process. Script tags in the workflow template may provide instructions to the workflow generator about what it must do to generate a workflow script (e.g. an instruction to repeat the script generation for each new location encountered in the order).

Script tags may also provide instructions to the workflow script generator about what it must do to generate a workflow script (e.g. an instruction to repeat the script generation for each new location encountered in the order).

A workflow script may also be subject direct (manual) implementation using the scripting language.

Figure 8:
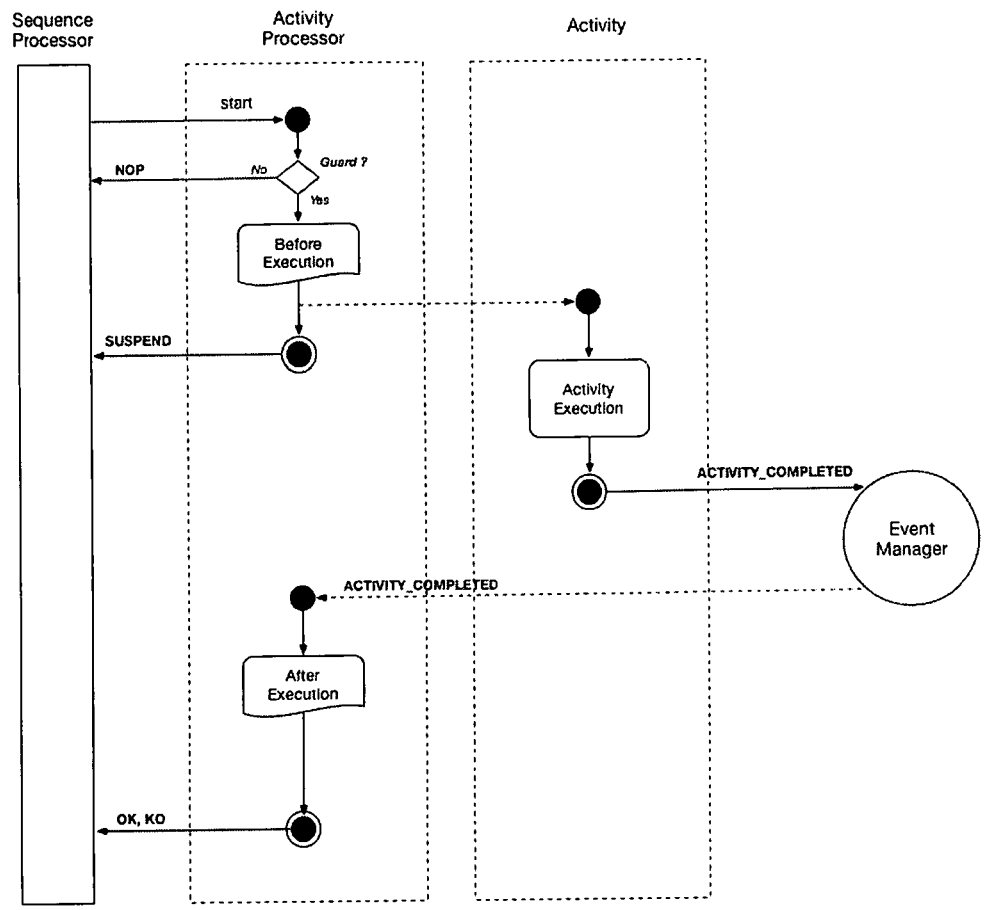
FIG. 8 is a schematic representation of a how a workflow script may be created from a combination of master data, a contract, an order, a workflow template, action templates and the data dictionary.
Figure 9:
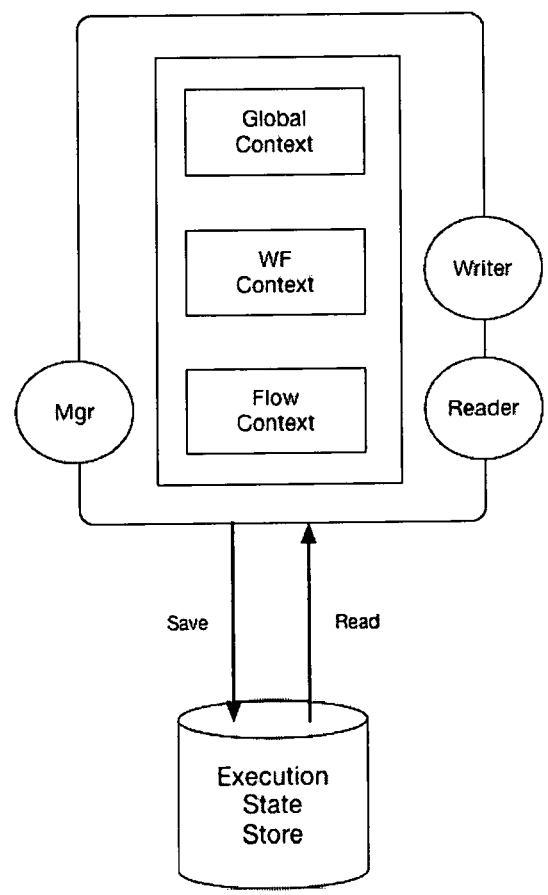
FIG. 9 is a schematic representation of a synchronous activity execution model, as used during the execution of a workflow script to complete an activity.
Figure 10:
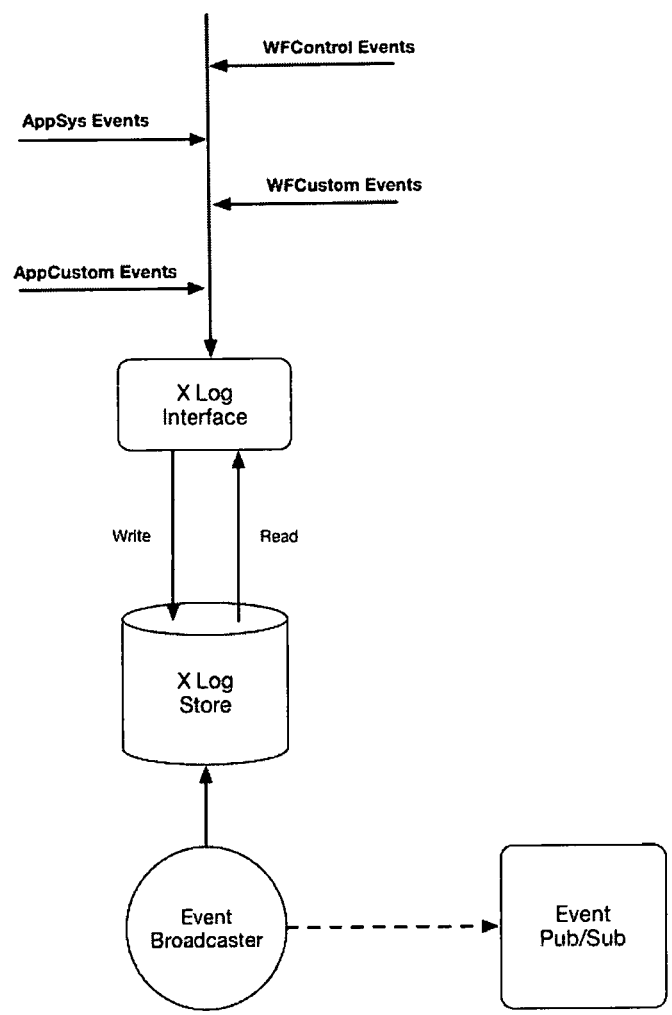
FIG. 10 is a schematic representation of an asynchronous activity execution model, as used during the execution of a workflow script to complete an activity.
Figure 16:
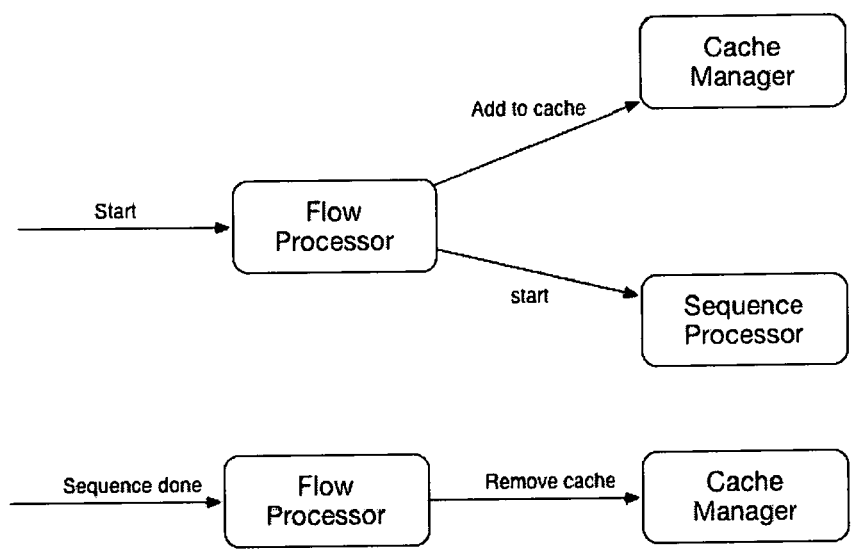
FIG. 16 is a schematic representation of how the workflow processor uses a cache manager.

Workflow scripts may be created on the mobile device or sent or imported to the mobile device through different channels like emails, SMS, or any chatting tools that supports the sharing of documents. Cloud Storage can also be used to retrieve a workflow script. Workflow scripts may be obtained from multiple sources through multiple channels (as well as being generated on the mobile device). (See FIGS. 08 and 16)

Workflow templates can be imported the same way the workflow scripts are. Master Data can be either retrieved from a web API or created by capture on the device, through different user interfaces.

The present invention is also capable of supporting imported workflow scripts defined in other business process languages such as BPEL. The mobile workflows are (Meta) dynamic in that the very structure of the mobile workflow script can be adjusted by multiple parties external to the mobile workflow and the mobile workflow script may instruct the workflow engine on the mobile device that it is to be replaced by a new structure. Mobile workflows that are being executed can create new mobile workflows—the conditions of a workflow's satisfaction can be completely changed during the execution of that workflow.

A commercial repository ("marketplace"—see FIGS. 20, 21, 22 and 23) of workflow templates, and action templates, cards, tools and utilities as supported by the workflow platform, ensures that these may be purchased or obtained from a store in a similar manner to Mobile Apps being purchased from an application store. For example, it is anticipated that a user can purchase or license the use of a mobile workflow template or workflow script from a workflow store and then import the workflow template or workflow script onto the mobile device.

Multiple parties may participate create, observe, update, change, terminate, roll-back, etc. a mobile workflow script during its execution with roles being defined by a permission structure that is specific to the workflow script, actions and activities being executed. In some scenarios it is possible to maintain a master workflow script repository on a back-end service. In these cases, the Repository Synchronization Module, will ensure that workflow scripts added to the remote repository are made available on the mobile device's local repository.

A runtime framework on the phone or mobile device provides a set of cards that can be invoked through the workflow script. Workflow scripts are device independent—one workflow script can work on multiple phone or mobile device operating systems (e.g. Android, IOS, Harmony OS or Windows).

Figure 12:
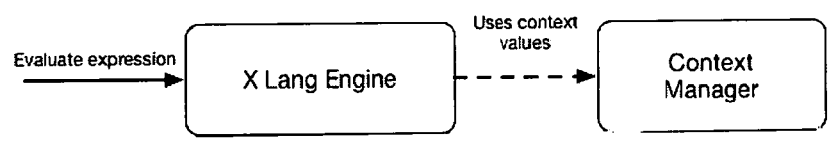
FIG. 12 is a schematic representation of an event manager.
Figure 13:
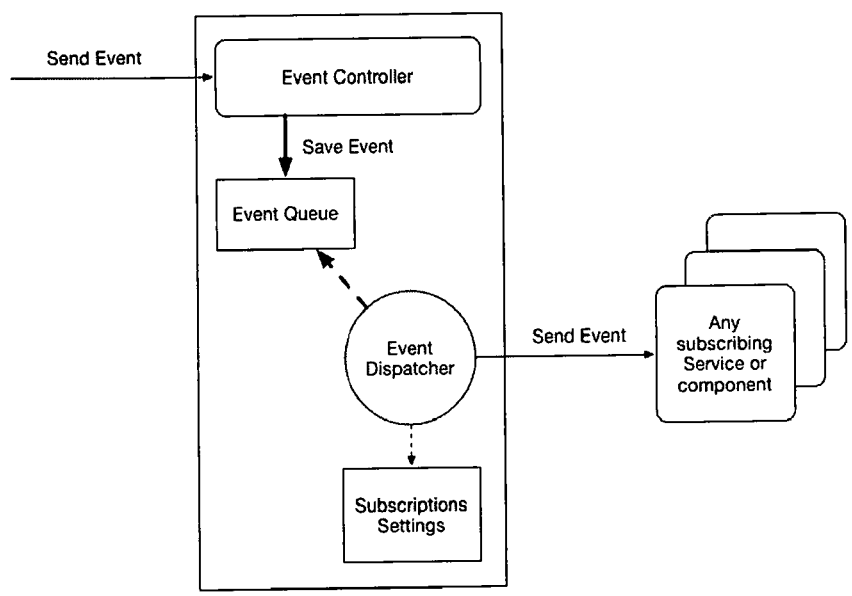
FIG. 13 is a schematic representation of script execution.
Figure 14:
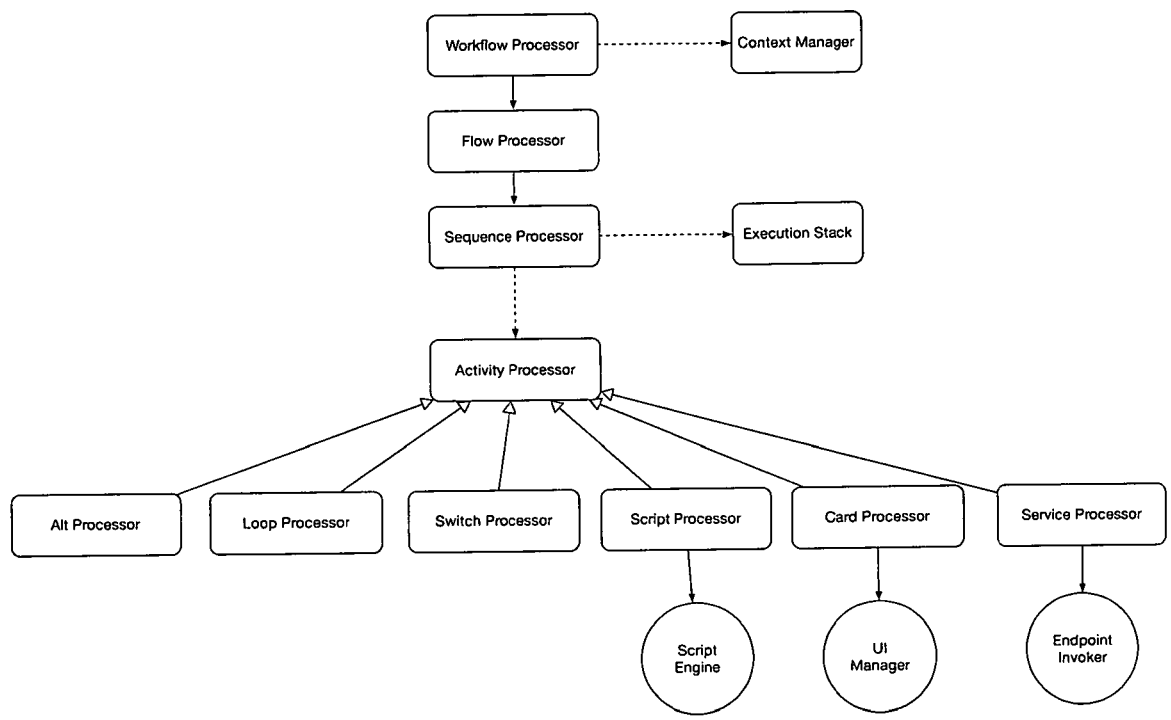
FIG. 14 is a schematic representation of an expression evaluator.

The execution of the workflow script creates a workflow archive (or log) that includes "job events" consisting of application system events, custom events, and workflow control events (as defined below). (see FIG. 12) The workflow log is capable of being synchronized with any third-party repository through synchronization end points provided on the phone or mobile device as part of the platform. Job events may be recorded by back-end services. Job events may also be transmitted to interested/permitted parties. A complete encrypted log of each completed job may also be stored on the back end.

The present inventive workflow platform supports custom screens (Cards) on the mobile device, script sequences (workflow scripts), a complex workflow flow execution control logic, and a wide variety of accesses to external services. A workflow script is anticipated to have access to all the services of the mobile device, all Cards and to the workflow engine, including the creation of a new workflow. It can also update master and context data.

Figure 11:
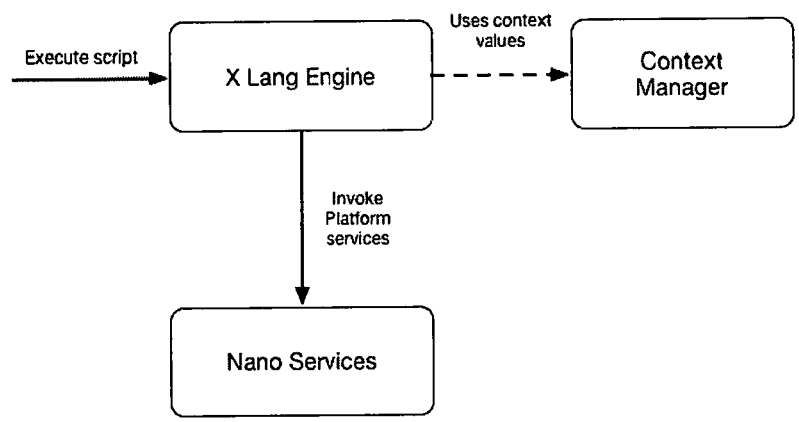
FIG. 11 is a schematic representation of a context manager.

A Context Manager (see FIG. 11) on the mobile device is used to store different execution contexts, containing "context values" that can be used within the workflow for processing. The Context Manager service functions are used to add or remove a context from the context manager and create a hierarchy of contexts. The reader service is used to resolve any context value requested, by inspecting the hierarchy of contexts. The writer service is used to write a context value in the dedicated context, either global or current, the current being the last context added. An Execution State Store is used to store all execution related data such as the sequence state, activity states and the Context for recovery, back-up, restart, and workflow reversal. The Context Manager is the unique source for parameterized context values. It is a dynamic database for the workflow.

Event handlers for "before", "after" and "undo" for Cards are all provided for by the workflow script and the workflow engine. To extend Cards technology, event handler slots are added to support any workflow script. The ability to "Undo" steps in the workflow is provided in order to undo activities that have been completed. The depth of the "undo" steps is defined by configuration.

The workflow can invoke third party applications, on the phone or mobile device and elsewhere, or third-party applications or users, on the phone or mobile device and elsewhere, can invoke a workflow. Also, the present invention allows for a workflow to invoke another workflow. The inventive platform additionally allows for a mobile workflow to pause while it waits for instructions from a third party (e.g. as may be needed to await information being delivered to the phone or mobile device for processing, or awaiting to instructions as to how the workflow should now change or proceed). A workflow script and the execution of the workflow script may change as a result of a receiving message from another service, application or user and it may also be changed by a workflow script.

The mobile platform supports multi-channel and multi-method, (asynchronous and synchronous) communications with multiple end points such as back-end servers or document servers. These channels may be whitelisted.

With this particular application multiple users and parties will be able to interact with other users and parties and be able to change remote mobile workflows during their execution and thereby increase efficiencies and decrease costs.

Within the repository is an archive/log that stores all the events generated by the mobile applications and by the workflow execution. The log is anticipated to support three types of job events:
1. Application System Events: These are all the possible predefined events generated by the application and system internals. Traces fall under this category.
2. Custom Events: These are custom events defined by configuration. A Custom Event corresponds to something that has occurred during creation, execution, and completion of a job. Custom events may be created by the workflow engine on the mobile device and by external services prior to, during and after the creation and execution of a workflow script or of an activity within a workflow script.
3. Workflow Control Events: These events are predefined events (emitted by the workflow engine or external services) used by the workflow engine to control the workflow execution.

Events stored in the log store can be broadcasted through the event dispatcher module. A single log file keeps a record of all the types of events listed above. (See FIG. 12)

The event manager is the module that receives and dispatches messages to predefined recipients. It is an asynchronous dispatch engine which uses multiple channels, subject to highly configurable settings. Subscribing services or components can be either: other modules inside the application; other applications on the mobile device through application interoperability mechanisms; or online APIs such as REST web services. Users and parties may also subscribe to events through the use of other messaging platforms that are better suited for human understanding like a web application, text message, chat service or email. External applications and users on the phone or mobile device and elsewhere can subscribe to events through the event manager.

Figure 15:
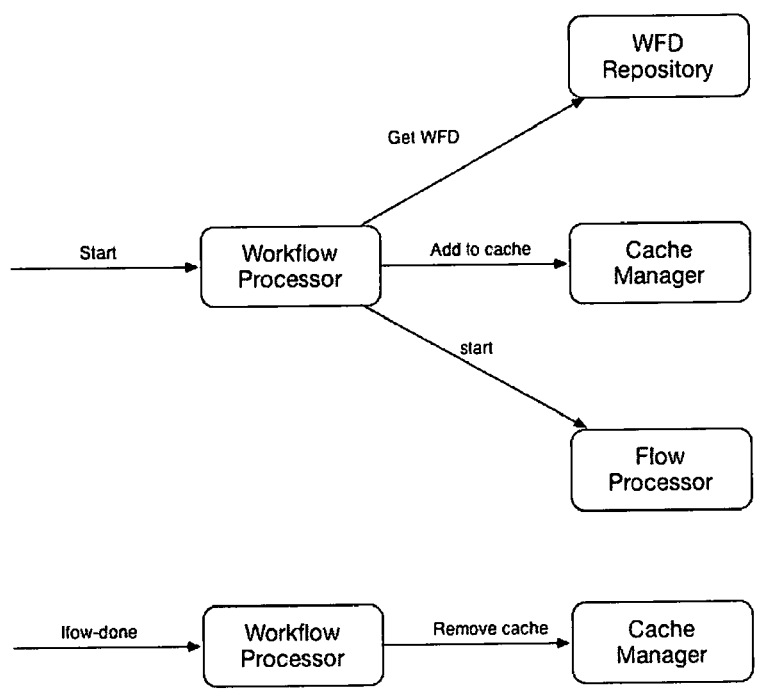
FIG. 15 is a schematic representation of processors. defined in the mobile device platform.

Processing components are shown in FIG. 15. When a workflow is required to be started, it retrieves the workflow script and initializes the execution. It creates a cache entry and adds it to the cache manager. Next, the Flow processor is started to execute the main flow of the workflow. Once the main flow is complete, the message "flow-done" appears. It allows the workflow processor to clear the cache manager (See FIG. 16).

Figure 17:
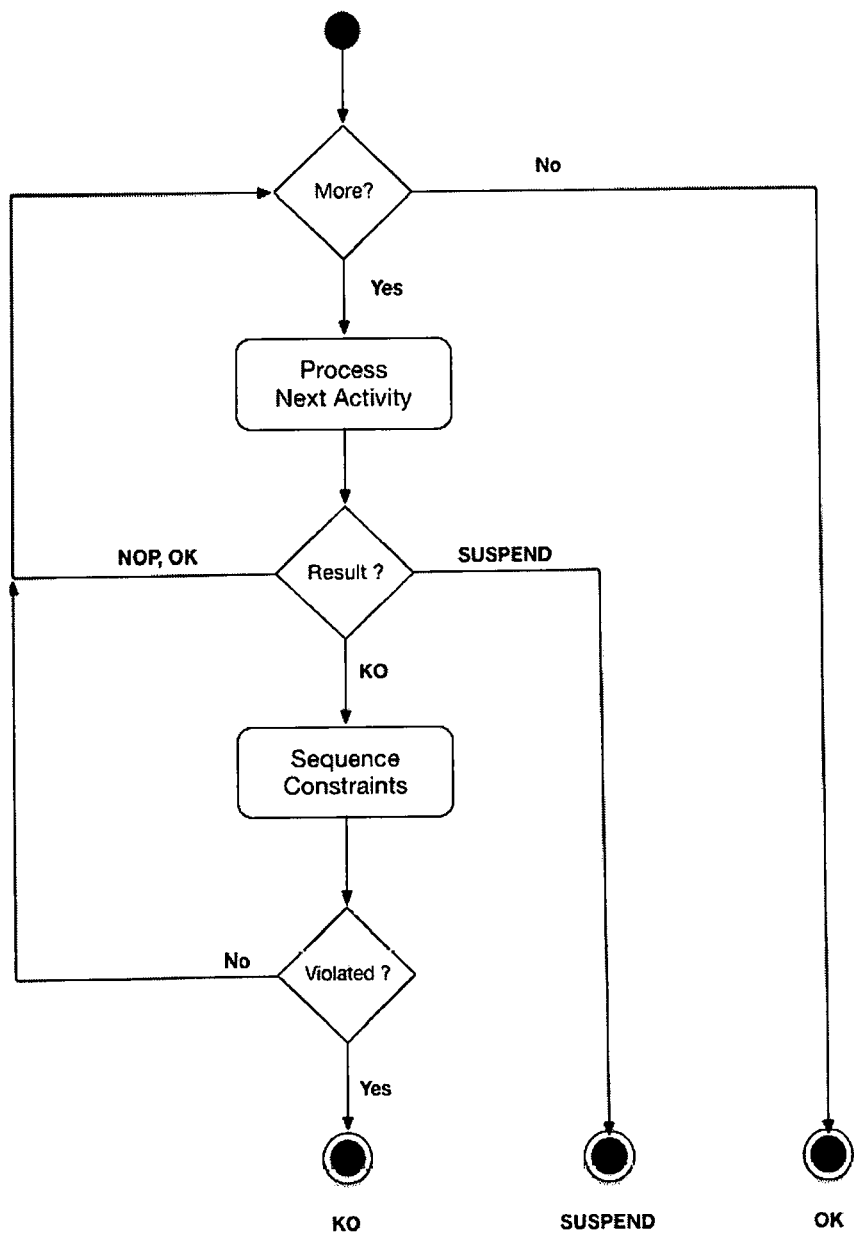
FIG. 17 is a schematic representation how the flow processor uses the cache manager.

Starting a flow will push its cache setting into the cache manager and starts its sequence of activities. Once the sequence of activities is done, the flow processor will be able to clean the cache (see FIG. 17).

Figure 18:
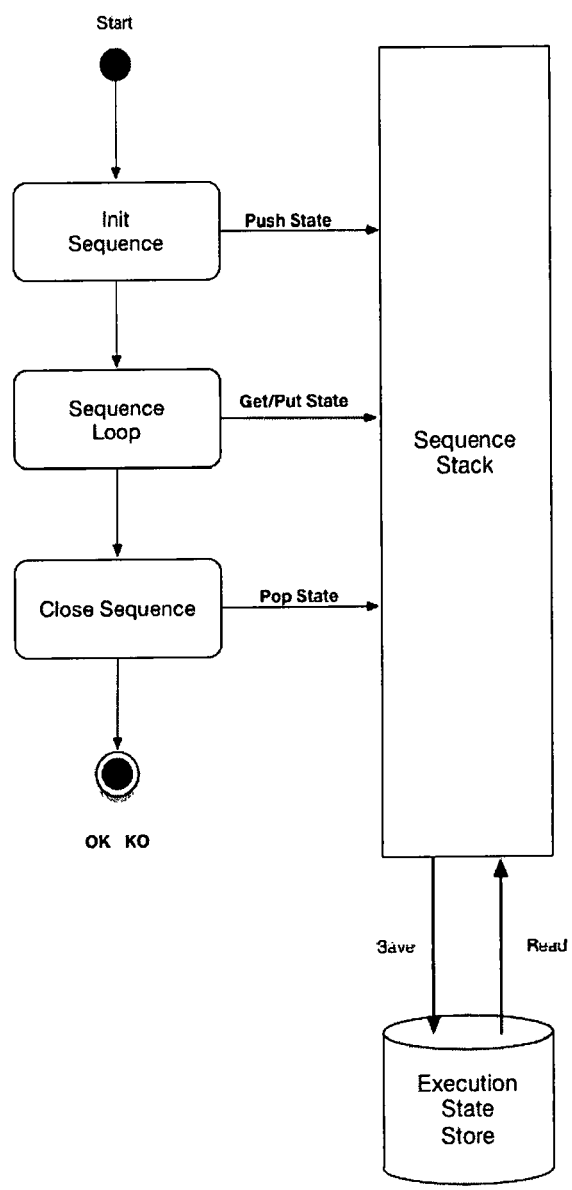
FIG. 18 is a schematic representation of a sequence processor processing activities.

A sequence processor provides a logic algorithm for the sequence of execution, which includes executing an ordered list of activities, providing constraints with regard to what activities must be completed, and if an activity is not completed, the sequence will end with the result "KO" (see FIG. 18).

Figure 19:
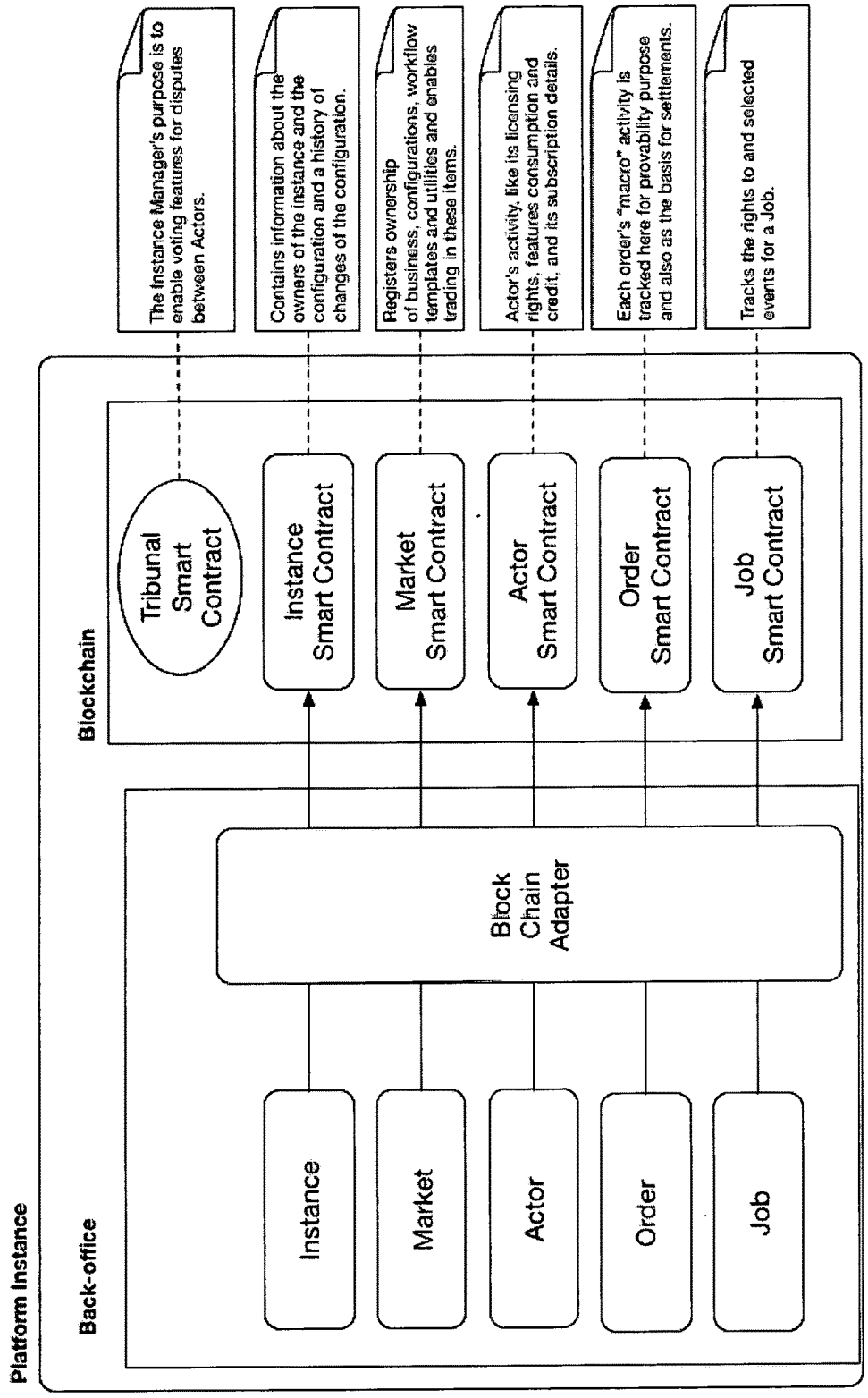
FIG. 19 is a schematic representation of a sequence state management.
Figure 20:
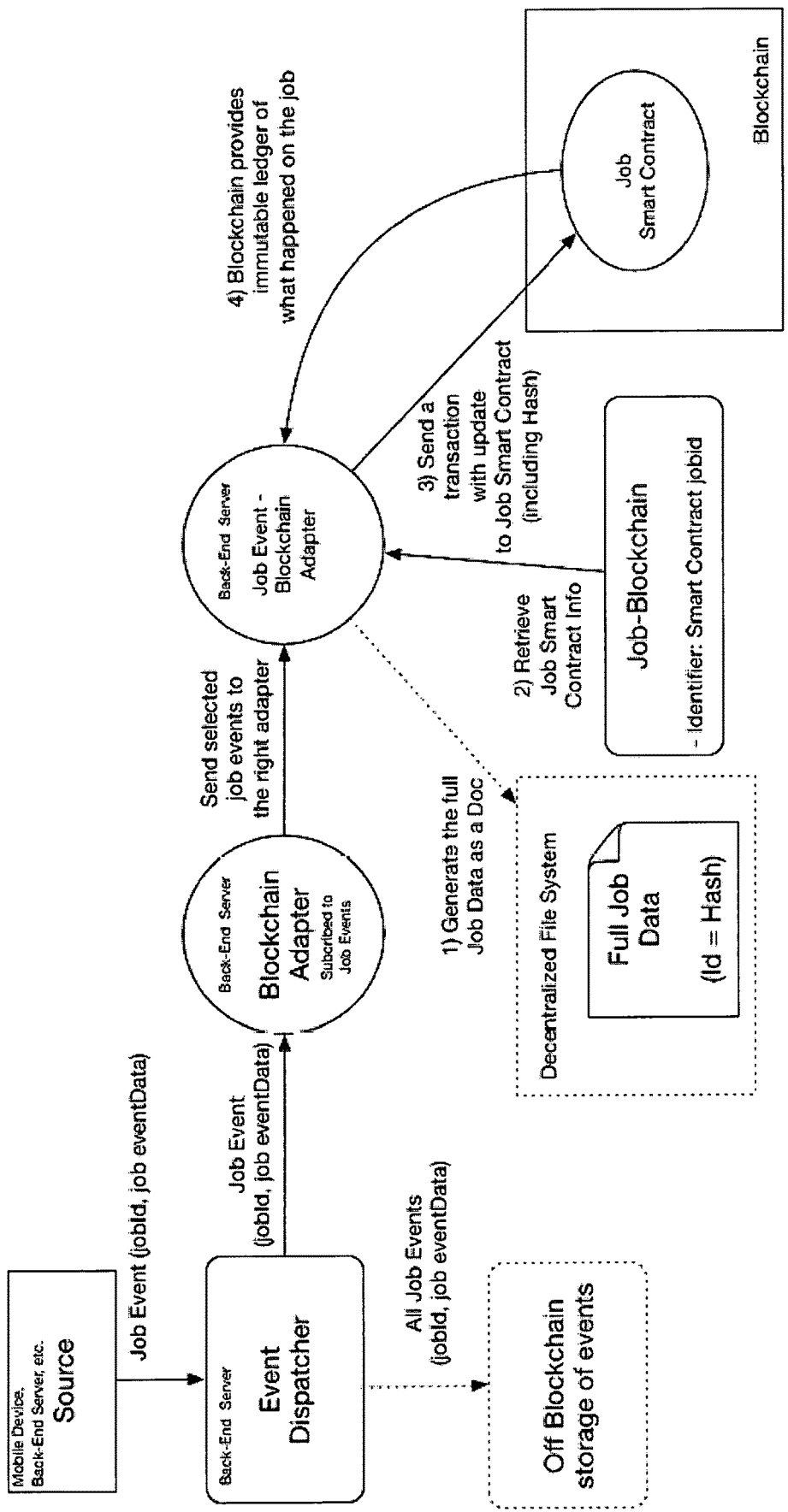
FIG. 20 is a schematic representation of how the information about the invention is stored on a back-end computer system such as a database or the blockchain.
Figure 21:
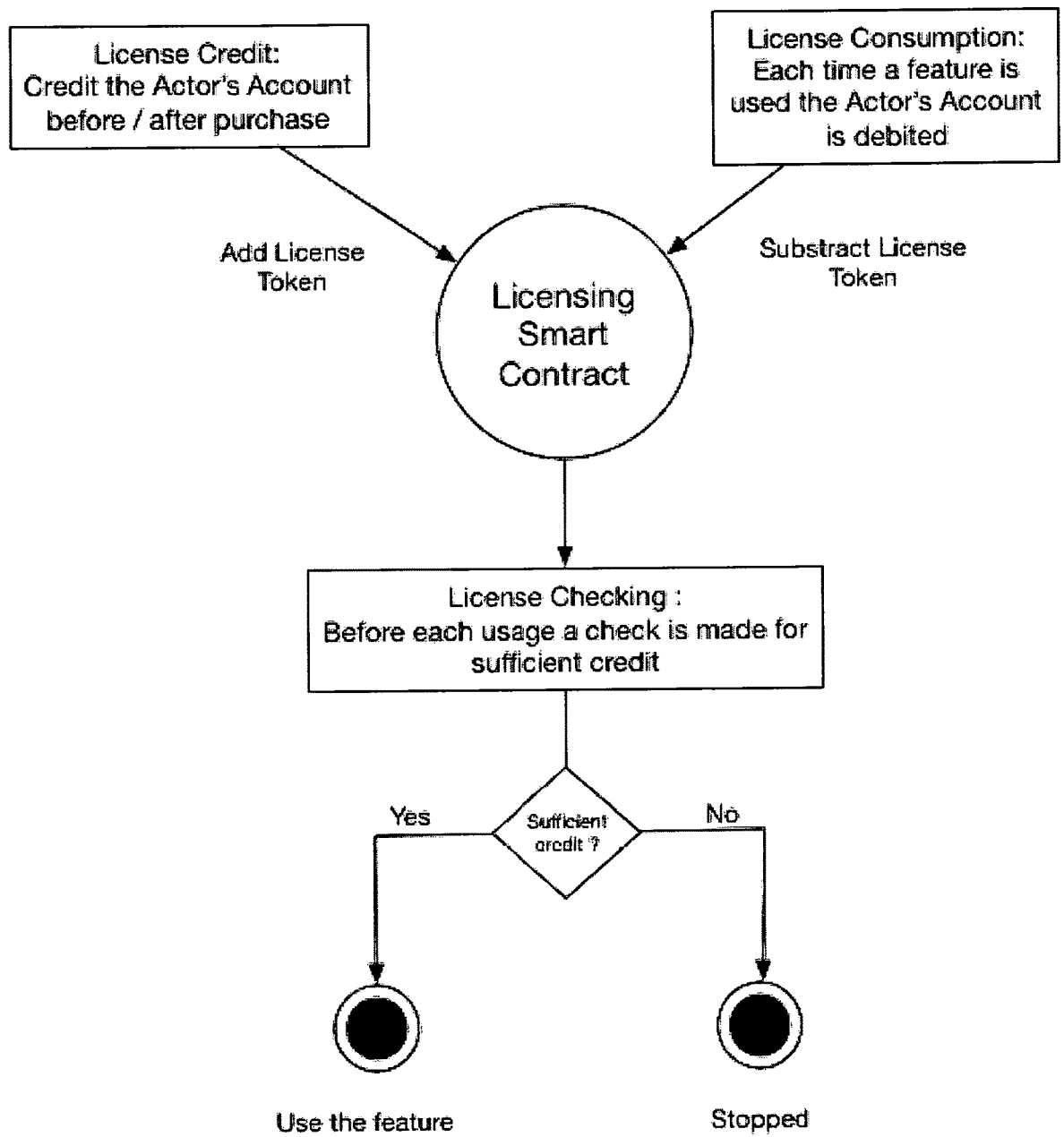
FIG. 21 is a schematic representation of how licensing for usage of the invention is supported.
Figure 22:
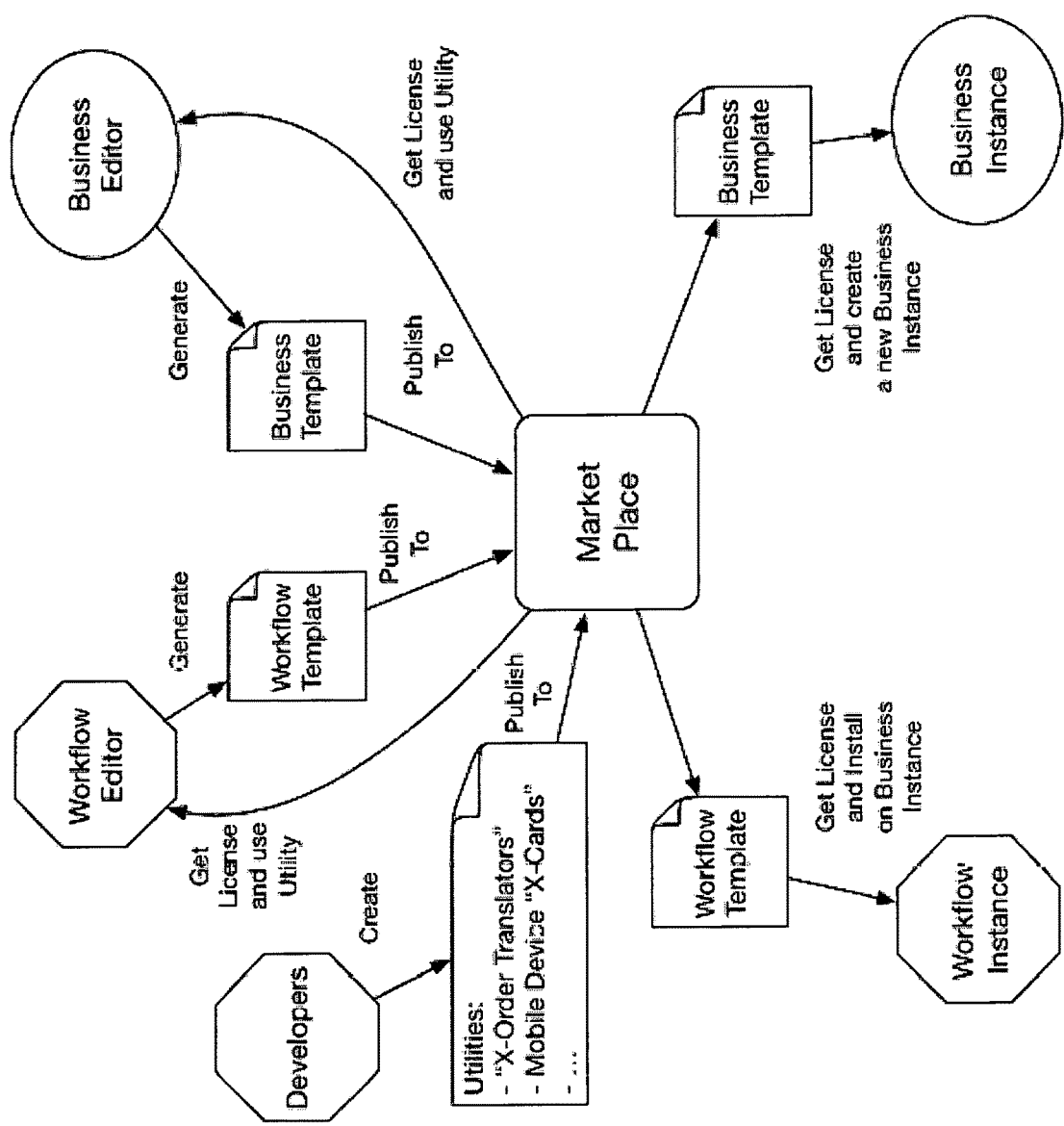
FIG. 22 is a schematic of how workflow templates, industry and business configurations, and utilities are traded in a marketplace.

A sequence state management mechanism is provided, which is comprised of sequence stack component. The sequence stack component will store the current activity for each nested sequence. Each started sequence will push its state into the sequence stack. When the sequence ends, it pops its state from the sequence stack. The sequence stack is stored into the execution state store. This ensures that each nested sequence will have its state preserved. The sequence state holds the current Activity processed (see FIG. 19).

The invention claimed is:
1. A mobile workflow execution platform which is comprised of:
   a workflow script;
   wherein the workflow script can be generated from master data and a workflow template by a workflow script generator;
   wherein the master data is data that includes an order, settings, and parameters;
   wherein the order, settings, and parameters guide the workflow script generator according to a defined precedence rule;
   wherein the workflow script can be shared to a mobile device through different communication channels or generated on a mobile device;
   wherein the workflow script has a permission structure specific to the workflow script and the job being executed that defines multiple parties' rights with respect to the execution of the workflow script;
   a scripting language;
   where the workflow script is encapsulated in a program written in a scripting language with specific mark-up tags to guide the workflow generator;
   services;
   wherein the services provided natively by the mobile device and external services can be invoked through the scripting language;
   cards;
   wherein the cards define the user interface on the mobile device and the system's interactions with external services and applications on the device;
   a workflow log;
   wherein the workflow log tracks application system events, custom events, workflow control events;
   wherein the workflow log can be synchronized with any third-party repository;
   wherein the workflow log, or selected events from the workflow log, may be stored on the back end;
   a workflow engine on the mobile device;
   wherein the workflow engine processes the workflow script;
   wherein the workflow engine provides access to the cards;
   wherein the workflow engine provides access to communications between the mobile device and other electronic devices;

wherein multiple parties can communicate with the workflow engine on the mobile device and change the workflow script during its execution, and hence change the execution of the workflow on the mobile device, as permitted by a security framework that is unique to that workflow script;

wherein the workflow engine may change the workflow script during its execution;

wherein the workflow engine on the mobile device continues to execute the workflow script autonomously when there are no communications available to other electronic devices;

wherein the workflow engine communicates with other electronic devices by sending job events asynchronously when communications are available to other electronic devices;

wherein a commercial repository and marketplace of business configurations are provided by workflow templates for purchasing utilities from an application store.

2. The mobile workflow execution platform as described in claim 1 wherein the mobile workflow platform is integrated with the back end.

3. The mobile workflow execution platform as described in claim 2 wherein the workflow job events can be recorded on the back end.

4. The mobile workflow execution platform as described in claim 1 wherein feature licensing is provided.

5. The mobile workflow execution platform as described in claim 4 wherein the platform manages each party's licensing rights to access features of the platform.

6. The mobile workflow execution platform as described in claim 4 wherein workflow script licensing is provided.

7. The mobile workflow execution platform as described in claim 6 wherein the platform manages each party's rights of access to each unique workflow script's execution.

* * * * *